United States Patent [19]
Kawamura et al.

[11] Patent Number: 5,225,989
[45] Date of Patent: Jul. 6, 1993

[54] APPARATUS AND METHOD FOR PERFORMING SIMULTANEOUS CONTROL OF CONTROL AXES OF A MACHINE TOOL

[75] Inventors: Hideaki Kawamura, Hachioji; Kentaro Fujibayashi, Musashino; Masafumi Sano, Oshino, all of Japan

[73] Assignee: Fanuc Ltd., Minamitsuru, Japan

[21] Appl. No.: 870,239

[22] Filed: Apr. 20, 1992

Related U.S. Application Data

[63] Continuation of Ser. No. 449,921, Dec. 15, 1989, abandoned.

[30] Foreign Application Priority Data

May 19, 1988 [JP] Japan ................... 63-122731

[51] Int. Cl.⁵ ............................. G05B 19/403
[52] U.S. Cl. ................. 364/474.11; 364/191; 364/474.23; 318/568.1
[58] Field of Search ......... 364/474.02, 474.11, 364/474.23, 191-193; 318/568.1

[56] References Cited

U.S. PATENT DOCUMENTS

| | | | |
|---|---|---|---|
| 4,590,572 | 5/1986 | Imanishi | 364/474.11 |
| 4,631,684 | 12/1986 | Akasofu et al. | 364/474.11 X |
| 4,692,856 | 9/1987 | Komiya | 364/474.11 |
| 4,814,999 | 3/1989 | Kawamura et al. | 364/474.11 X |
| 4,878,172 | 10/1989 | Matsumura | 364/474.11 X |

FOREIGN PATENT DOCUMENTS

2702525A1  1/1976  Fed. Rep. of Germany.

Primary Examiner—Joseph Ruggiero
Attorney, Agent, or Firm—Staas & Halsey

[57] ABSTRACT

A control apparatus for a built-on machine tool according to the invention has a plurality of heads or cutters connected to control axes of respective control systems which are controlled independently by individual control programs. The apparatus includes commander for synchronously issuing a standby command or standby-cancellation command to each system, and timing setting means for setting standby command timing or standby-cancellation command timing between systems brought into coincidence by the command means, wherein standby timing or standby-cancellation timing set with regard to the program of one specific system decides the timing of standby control by the program of another specific system. As a result, a system to be put on standby and a system to be released from standby can be designated at will to enable highly efficient control of the machine tool.

15 Claims, 2 Drawing Sheets

FIG. 1

PROGRAM OF CHANNEL 1

```
O0001:
G90G92X0Z0:
G00X100.Z100.T0101:
M0○○○23:
GggT0005S200M03:
.
.
.
```
— 1

FIG. 2

PROGRAM OF CHANNEL 2

```
O0002:
G90G92X0Z0:
G00X100.Z100.T0101:
M1○○○1 :
GggP0100G01X100.Z50.F100:
.
.
.
```
— 2

FIG. 3

PROGRAM OF CHANNEL 3

```
O0003:
G90G92X0Z0:
G00X100.Z100.T0101:
M1○○○1 :
GggQ157.G02X200.Y200.R100.F100:
.
.
.
```
— 3

APPARATUS AND METHOD FOR PERFORMING SIMULTANEOUS CONTROL OF CONTROL AXES OF A MACHINE TOOL

This application is a continuation of U.S. application Ser. No. 07/449,921, filed Dec. 15, 1989, now abandoned.

FIELD OF THE INVENTION

This invention relates to a built-on machine tool control apparatus in which a plurality of heads or cutters are connected to control axes of respective ones of a plurality of control systems and are controlled independently by individual control programs.

DESCRIPTION OF RELATED ART

In a conventional built-on machine tool, synchronous control is performed through a queuing timing setting method in which identical codes are written in each of the programs corresponding to channels for controlling, say, two heads. When one of the heads receives a command from the codes, execution of control is interrupted and control is resumed simultaneously at the moment the other head receives the same codes. Moreover, in a method wherein the same M code (auxiliary function code), by way of example, is set in each of the programs and coincidence is achieved in terms of command timing between two independently executed programs, synchronous control can be realized only in program block units. In addition, the M code set in this case is placed at the beginning of the program block and is issued as a command only between blocks. As a result, queuing timing is executed only at the breaks between blocks.

With a conventional built-on machine tool control apparatus of this kind, it is difficult to machine more complicated shapes smoothly and rapidly by controlling a machine tool having two or more control systems. The reason is that it is necessary to distinguish between the control systems of two or more heads or cutters. A problem that arises is that the program execution steps are lengthened in order to actually carry out this identification. Moreover, this is accompanied by a need for a greater number of machining steps performed by the machine tool.

For these reasons, various schemes for employing a plurality of heads or cutters efficiently have been devised in the art. With the above-described conventional queuing timing setting method, however, limitations are encountered in shortening the program execution steps and machining time.

SUMMARY OF THE INVENTION

The present invention has been devised in order to solve the foregoing problems and its object is to provide a built-on machine tool control apparatus in which, in queuing control of the operation of a plurality of heads or cutters, it is possible to command standby and cancellation of standby between systems in any combination, and to make settings at any timing.

In accordance with the present invention, there can be provided a built-on machine tool control apparatus in which each system of a built-on machine tool having a plurality of systems (channels) is controlled by a respective one of a plurality of independently executable programs. It is further possible to designate standby and cancellation of standby between systems. These operations are accomplished by command means for synchronously issuing a standby command or standby-cancellation command to each system, and timing setting means for setting standby command timing or standby-cancellation command timing between systems brought into coincidence by the command means, wherein standby timing or standby-cancellation timing set by the program of one specific system decides the timing of control by the program of another specific system.

In accordance with the built-on machine tool control apparatus of the present invention, queuing among a plurality of channels can be commanded by any combination or at any timing after blocks which have achieved coincidence. In particular, when a built-on machine tool having three or more heads or cutters is controlled, loss of use of heads or cutters is eliminated so that machining can be performed efficiently. By controlling the built-on machine tool in this manner, machining of a workpiece having a complicated shape requiring a number of steps can be carried out in a shorter period of time.

BRIEF DESCRIPTION OF THE DRAWINGS

FIGS. 1 through 3 show examples of programs illustrating an embodiment of the present invention;

DESCRIPTION OF THE PREFERRED EMBODIMENTS

Figure 4:
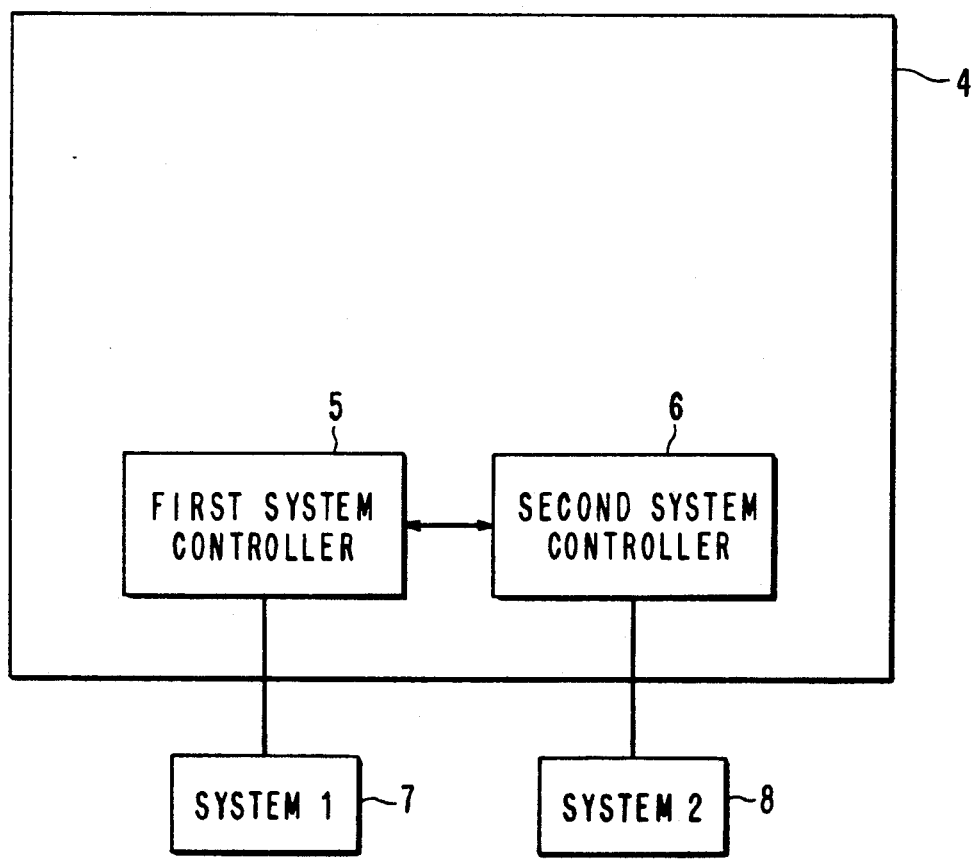
FIG. 4 is a built-on machine tool control apparatus in accordance with the present invention.

An embodiment of the present invention will now be described in detail with reference to the drawings.

Queuing among a plurality of channels is executed by two types of program commands, set forth below, or programs which include parameters. These commands are set beforehand in the programs controlling the individual channels.

(1) Standby Command (M1)

This command is issued at the beginning of a program block and temporarily places axis control of the corresponding system (channel) in a standby state. This program command is read out of the program as the function instruction of a code M1, by way of example. At the channel which has received this command, execution of the program that will resume is interrupted until there is a standby-cancellation command from a channel of another channel number contained in the same block which follows the command code M1 or from one or more channels set by parameters.

In actuality, the start of the standby state is set by a preliminary function code Ggg, described later, and a prescribed timing following issuance of M1 can be selected.

(2) Standby-Cancellation Command (M0)

This command is issued at the beginning of a program block and releases axis control of another system (channel), here designated, from the standby state. This program command is read out of the program as the function instruction of a code M0, by way of example, and commands cancellation of standby of a channel whose channel number follows the command code M0 or of one or more channels set by parameters here contained. A channel thus released from the standby command resumes execution of the interrupted program.

It is possible to select the timing of standby cancellation by a program command or parameter just as in the case of the standby command.

(3) Standby Command Priority Mode and Standby-Cancellation Command Priority Mode A standby command priority mode refers to a mode in which, when it is set so that a plurality of channels are designated in the standby command M1 and standby cancellation is commanded, the standby state continues until the cancellation command is received from all designated channels. The standby cancellation command priority mode refers to a mode in which, when it is set so that a plurality of channels are designated in the standby command M1 and standby cancellation is commanded, the standby state is maintained until the cancellation command is received from any designated channel. Either of these modes is selected by a program command or parameter.

(4) Standby Start or Cancellation Timing Command Method

The timing at which the standby state is actually started or cancelled by the abovementioned commands (1) and (2) between systems for which coincidence has been verified differs depending upon whether the command of the program block following M0, M1 is a move command or not.

More specifically, if the command of the program block following M0, M1 is not a move command but, say, an S-function code which designates the rotational speed of a spindle, the timings of standby start and standby cancellation can be staggered from block starting time by a length of time designated by a program command or parameter. An example of this method is one in which a G code of the kind set forth below and the timing setting which follows it are inserted at the beginning of the next program block.

If the command of the program block which follows M0, M1 is a move command such as G01 or G02, it is possible to set standby-start timing and standby-cancellation timing by designating a designated remaining amount of movement or number of distributed pulses. This is in addition to the method of designating time by a program command or parameter. An example of this method is one in which a specific G code is inserted at the beginning of the next program block along with the designation of the remaining amount of movement or number of distributed pulses that follows this G code.

A method of setting queuing among the programs of three channels will now be described in line with specific programs capable of practicing the present invention and with reference to the drawings.

In FIGS. 1 through 3, numeral 1 denotes a program of channel 1; 2 a program of channel 2; and 3 a program of channel 3. It will be assumed here that all of the commands have been set in the standby command priority mode.

The programs 1, 2 and 3 each are such that a corresponding system is designated by an initial block, with a coordinate system being set and positioning carried out by second and third blocks. G90 is a code for designating absolute dimensions, and more specifically a command for treating coordinates in a block as absolute dimensions. G92 is a command code for revising or setting a coordinate system by a programmed dimension word. G00 is a positioning code and sets a prescribed tool at a prescribed location by a T code which designates the tool number.

Thereafter, in channels 2 and 3, M10001; of the fourth program block commands standby. In actuality, however, the condition for setting the timing of standby start is designated in the next or fifth block. Therefore, in channel 2, the standby state is not immediately established by the command P0100 which follows the timing setting code Ggg; rather, linear interpolation based on G01 is started and the standby state is achieved after distribution of 100 pulses in the interpolation. In other words, after the set timing has arrived, the standby state is in effect until appearance of the standby-cancellation command M0 having the same queue number 000 in the program block of channel 1 designated by the standby command M10001;.

In channel 3, the standby state is not immediately established by the command Q157. which follows the timing setting code Ggg; rather, circular interpolation based on G02 is started and the standby state is established after the remaining amount of movement becomes 157 mm.

In the fourth block of channel 1, the standby-cancellation command M000023; commands cancellation of standby. However, in accordance with the Ggg command in the next block and the following T0005S200M03, cancellation of standby in channels 2 and 3 is actually commanded five seconds after the spindle begins rotating clockwise at a predetermined speed. If the channel designated in this case is not being held in standby, an alarm is issued or the cancellation command is nullified. Alternatively, the fact that cancellation has been commanded is stored and standby is cancelled at the moment that the designated channel is placed in standby. It is so arranged that this distinction can be set by program or by parameter.

If neither the abovementioned standby command nor standby cancellation command have a specific G-code command such a Ggg in the block which follows it, the standby-start state or standby-cancel state is established immediately prior to start of the next block.

FIG. 4 is a built-on machine tool control apparatus in accordance with the present invention. In FIG. 4, the built-on machine tool control apparatus includes first and second system controllers 5, 6. The first and second system controllers 5, 6 are coupled to system 17, and system 28, respectively. The first and second system controllers 5, 6 execute respective independently executable programs to control system 17 and system 28, respectively. Each of system 17 and system 28 control a respective group of axes of a numerically-controlled machine.

In the examples of the programs mentioned above, the number of channels is three. However, there are cases in which the number of channels is more than three in dependence upon the number of systems in the machine tool, and it goes without saying that the designation of channel numbers can also be set at will. In addition, with regard to the hardware configuration of the actual control apparatus, the invention can be realized by hardware possessing ordinary processing functions such as a program decoding function and function for comparing each of the set values.

Though an embodiment of the present invention has been described, the invention is not limited to this embodiment but can be modified in various ways without departing from the scope of the claims.

The present invention is useful as an apparatus for program control of a built-on machine tool having a plurality of heads or cutters.

We claim:

1. A built-on machine tool control apparatus wherein each system (channel) of a built-on machine tool including a plurality of systems (channels) is controlled by a respective one of a plurality of independently executable programs and wherein standby and standby-cancellation can be designated between systems, comprising:

command means for synchronously issuing at least one of a standby command and a standby-cancellation command to each system (channel); and timing setting means for setting at least one of a standby command timing and a standby-cancellation command timing between systems brought into coincidence by said command means, at least one of a standby timing and a standby-cancellation timing set by the execution of the respective one of the plurality of independently executable programs of one system determining a timing of control of another system.

2. A built-on machine tool control apparatus according to claim 1, wherein said command means, by specifying two or more other systems contained in each program, synchronously commands at least one of standby and standby-cancellation of the two or more other systems.

3. A built-on machine tool control apparatus according to claim 2, wherein said command means, in response to at least one of a standby command priority mode and a standby-cancellation command priority mode set by each program, synchronously commands at least one of standby and standby-cancellation for any one or all of two or more specified systems.

4. A built-on machine tool control apparatus according to claim 1, wherein said timing setting means sets the timing for executing at least one of a synchronously commanded standby command and a standby-cancellation command based upon at least one of an elapse of a selected time after a command, a number of distributed pulses issued to the built-on machine tool, and a remaining amount of movement of a part of the built-on machine tool.

5. A built-on machine tool control apparatus according to claim 1, wherein the at least one of the standby timing and the standby-cancellation timing is determined by execution of a Ggg code.

6. A machine tool control apparatus comprising:
   a first system controller for executing a first command to cause the first system controller to enter a standby mode, and for executing a second command which determines a timing for executing the first command; and
   a second system controller designated by the first command, for executing a third command to cause the first system controller to enter a standby-cancellation mode.

7. A machine tool control apparatus according to claim 6, wherein the first command designates a third system controller, wherein the third system controller executes a fourth command to cause the first system controller to enter a standby-cancellation mode, and wherein the first system controller does not enter the standby-cancellation mode until execution of the third and fourth commands.

8. A machine tool control apparatus according to claim 6, wherein the first command designates a third system controller, wherein the third system controller executes a fourth command to cause the first system controller to enter a standby-cancellation mode, and wherein the first system controller enters the standby-cancellation mode upon execution of at least one of the third and fourth commands.

9. A machine tool apparatus according to claim 6, wherein the first command is an M1 code.

10. A machine tool apparatus according to claim 6, wherein the second command is a Ggg code.

11. A machine tool apparatus according to claim 6, wherein the third command is an M0 code.

12. A machine tool control apparatus comprising:
    a first system controller for executing a first command for a standby-cancellation mode, and for executing a second command which determines a timing for executing the first command; and
    a second system controller designated by the first command, which enters a standby-cancellation mode upon execution of the first command by the first system controller.

13. A machine tool control apparatus according to claim 12, wherein the first command is an M1 code.

14. A machine tool control apparatus according to claim 12, wherein the second command is a Ggg code.

15. A machine tool control apparatus according to claim 12, wherein the third command is an M0 code.

* * * * *